United States Patent [19]

Guthrie

[11] 4,384,050

[45] * May 17, 1983

[54] FLEXIBLE POLYURETHANE FOAM BASED ON MDI

[75] Inventor: James L. Guthrie, Ashton, Md.

[73] Assignee: W. R. Grace & Co., New York, N.Y.

[*] Notice: The portion of the term of this patent subsequent to May 17, 2000, has been disclaimed.

[21] Appl. No.: 314,554

[22] Filed: Oct. 26, 1981

[51] Int. Cl.$^3$ .................... C08G 18/14; C08G 18/77; C08G 18/32

[52] U.S. Cl. .................... 521/137; 521/160; 521/174; 521/901; 521/905; 521/914

[58] Field of Search ............... 521/160, 174, 901, 905, 521/914, 137

[56] References Cited

U.S. PATENT DOCUMENTS

| | | | |
|---|---|---|---|
| 3,890,254 | 6/1975 | Guthrie | 521/905 |
| 3,939,123 | 2/1976 | Matthews et al. | 260/77.5 AM |
| 4,008,189 | 2/1977 | van Leuwen et al. | 521/905 |
| 4,049,592 | 9/1977 | Marans et al. | 521/905 |
| 4,160,076 | 7/1979 | Guthrie et al. | 521/914 |
| 4,237,240 | 12/1980 | Jarre et al. | 521/159 |
| 4,256,849 | 3/1981 | Ick et al. | 521/160 |
| 4,292,412 | 9/1981 | Wood | 521/905 |
| 4,309,509 | 1/1982 | Wood | 521/905 |
| 4,314,034 | 2/1982 | Fulmer et al. | 521/905 |
| 4,317,200 | 1/1979 | Wood et al. | 521/905 |

FOREIGN PATENT DOCUMENTS 874430 8/1961 United Kingdom.
1209058 10/1970 United Kingdom.

OTHER PUBLICATIONS

Tech. Service Report, The Upjohn Co., LaPorte, Texas, "Isonate 143L Liquid MDI".
Technical Information, The Upjohn Co., LaPorte, Texas, "PAPI 94".

Primary Examiner—H. S. Cockeram
Attorney, Agent, or Firm—Edward J. Cabic

[57] ABSTRACT

A flexible, hydrophobic polyurethane foam is produced by mixing together an aqueous phase which can optionally contain reinforcing fibers and surfactants and a resin phase comprising a prepolymer derived from a poly (oxy $C_{2-4}$ alkylene) diol having a molecular weight of at least about 1100, an MDI containing isocyanate product having a functionality greater than 2.0 made of a mixture of MDI and isocyanate containing derivatives of MDI, and a monomeric polyol crosslinking agent having 3 or 4 hydroxyl equivalents per mole. The preferred polyol is trimethylolpropane and the diol is an equimolar mixture of Carbowax 1000 and Carbowax 1450. The diol and the polyol, such as trimethylolpropane, are present in a mole ratio in the range of 4:1 to 8:1 while the ratio of the isocyanate equivalents to the total hydroxyl equivalents is in the range of 2.5:1 to 3.5:1. The isocyanate containing product comprises less than 50% by weight of the prepolymer and Isonate 143L is the preferred isocyanate product. Flexible foams are obtained which are water-absorbing for medical or personal care applications.

19 Claims, No Drawings

FLEXIBLE POLYURETHANE FOAM BASED ON MDI

CROSS-REFERENCE TO RELATED APPLICATION

U.S. Application Ser. No. 314,555 filed Oct. 26, 1981 discloses flexible MDI based polyurethane foams made with a polymeric polyol cross-linking agent having 3 or 4 hydroxyl equivalents per mole and a molecular weight of at least 500.

BACKGROUND OF THE INVENTION

1. Field of the Invention

This invention relates to a polyurethane prepolymer and the resulting flexible foam that can be made from the prepolymer when it is mixed with water.

2. Description of Previously Published Art

Flexible polyurethane foams made with TDI (toluene diisocyanate) have been manufactured for many years, especially for cushion and mattress applications. However, for hydrophilic foams used in medical or personal care applications it is desirable to replace the TDI in the foams with MDI (methylene diphenyl isocyanate) because of the high vapor pressure and relatively high toxicity of TDI which requires special precautionary measures during processing and use. Furthermore, TDI-based foams can be weakened by hydrolysis during sterilization or storage in a wet package. For example, TDI-based hydrophilic foams can liquify after a few cycles in a steam autoclave at 120° C. TDI-based hydrophilic foams also swell excessively when wet such as on the order of more than 100% by volume.

Conventional polyurethane foams have been made from MDI. These foams are rigid or semi-rigid because MDI imparts crystallinity. In British Pat. No. 874,430, flexible polyurethane foams are produced by reaction of polyether polyols with at least two hydroxyl groups and a polyisocyanate mixture consisting of diarylmethane diisocyanates and 5 to 10 percent by weight of a polyisocyanate having a functionality greater than 2 in the presence of a small amount of water. A catalyst can be used in optional embodiments. These foams have the disadvantages that they are not hydrophilic and are not made with sufficient quantities of water to allow transport of large amounts of fibers, fillers, antiseptics, or other water-dispersible components into foams used in medical or personal care applications. The term hydrophilic as used herein means that the foam product is able to absorb 15–20 times its weight of water. A further disadvantage is that in the case of the optional catalyst there can remain catalyst residue which is not desirable.

In U.S. Pat. No. 4,237,240, flexible MDI-based foams with high load-bearing and high energy-absorption capacity are made by reaction of diphenylmethane diisocyanates with polyester polyols or mixtures of polyester polyols and polyether polyols with a polyester polyol content of at least 60 percent by weight of the polyol mixture, and small amounts of water. As set forth in the claims, a catalyst is employed. These foams have the same drawbacks as those of the above-described British Pat. No. 874,430 including the undesirable catalyst residues in the foam and in addition they require the use of the more expensive polyester polyols.

In British Pat. No. 1,209,058, flexible hydrophilic polyurethane foams can be made by reacting a polyisocyanate with polyether polyols which contain at least 10% by weight of a block copolymer of ethylene oxide capped with propylene oxide to obtain hydrolytic stability. The method requires using at least one divalent tin salt of a fatty acid and/or at least one tertiary amine as a catalyst. The foam products made by this method, while being hydrophilic, have the drawback of being made with only small amounts of water as well as requiring the use of the block copolymers. Moreover, there is no teaching of the use of MDI, which is hydrophobic to make hydrophilic foam products and the resulting foam will contain undesirable catalyst residues.

3. Objects of the Invention

It is an object of this invention to provide an improved, flexible polyurethane foam which is made from a prepolymer system containing MDI as the only isocyanate source.

It is a further object of this invention to provide an improved, flexible polyurethane foam which can contain large amounts of fibers, fillers, antiseptics or other water-dispersible components.

It is a further object to produce a flexible, hydrophilic foam which is white in color so that it can be used in medical and health care applications.

It is a further object to produce a polyurethane prepolymer having MDI and its derivative as the only isocyanate source which can be stored for an indefinite period of time and yet when mixed with an approximately equal amount of water, which can be used as a carrier for water-dispersible ingredients, will form a hydrophilic foam product.

It is a further object to produce a polyurethane prepolymer having MDI and is derivative as the only isocyanate source which has viscosity stability over time.

It is also an object to produce a polyurethane prepolymer having MDI and its derivatives as the only isocyanate source which has less than 50% by weight of the isocyanate and which will produce a flexible foam.

These and further objects will become apparent as the description of the invention proceeds.

SUMMARY OF THE INVENTION

Flexible foams which are water-absorbing for medical or personal care applications can be made by using an MDI derived isocyanate as the sole isocyanate. The foams are made from a prepolymer having at least one poly(oxy $C_{2-4}$ alkylene) diol having a molecular weight of at least about 1100 and having at least 50% by weight oxyethylene groups such as a Carbowax made by Union Carbide, a monomeric polyol crosslinker having 3 or 4 hydroxyl equivalents per mole such as the triol trimethylolpropane and a methylene-bis (phenyl isocyanate), hereinafter MDI, based isocyanate product having a functionality greater than 2.0 such as Isonate 143-L made by Upjohn Polymer Chemicals which has a functionality of approximately 2.1 and which is made of a mixture of MDI and isocyanate containing derivatives of MDI.

One of the key features of the prepolymer formulation is restricting the amount of the isocyanate such as Isonate 143-L so that it is less than 50% and typically 38–46% of the weight of the prepolymer. The requirement for the isocyanate component is reduced by increasing the average molecular weight of a diol component so it is greater than 1100. When using trimethylolpropane as the monomeric crosslinking agent, the preferred diol molecular weight levels are at 1200–1400 and the diol contains at least 80% by weight of oxyethylene groups. The diol used in a preferred embodiment is a mixture of two diols having different molecular weights. For example one diol can have a molecular weight of 1000 while the other can have a molecular weight of 1450.

The actual content of free MDI can be adjusted up or down in this isocyanate containing product so long as the functionality remains greater than 2.0. For example, additional pure MDI could be added.

DESCRIPTION OF THE PREFERRED EMBODIMENTS

Prepolymers with moderate viscosity and with good viscosity stability can be made with polyether polyols, an MDI containing isocyanate product such as Isonate 143-L and TMOP as a monomeric crosslinking agent. However, when this prepolymer is mixed with water the foam obtained is typically a white, semi-rigid foam which, while suitable for use as an abrasive sponge, is not suitable for use as a cushion or as a flexible foam. See, for example, U.S. application Ser. No. 314,537, filed Oct. 26, 1981 which is a continuation-in-part of U.S. application Ser. No. 220,562 filed Dec. 29, 1980, now abandoned, where MDI containing foams were made with Isonate 143-L, Carbowax 1000, and trimethylolpropane (TMOP) as the crosslinking agent to impart strength to the foam. Since the TMOP has such a low equivalent weight of 44.7, the prepolymer requires large amounts of the isocyanate component, Isonate 143-L, to cap all of the hydroxy groups. The amount of isocyanate is on the order of 50–55% by weight and this makes the foams relatively stiff and hydrophobic.

It has now been discovered that in MDI containing systems containing a poly(oxy $C_{2-4}$ alkylene) diol and TMOP, for example, as the monomeric crosslinking agent the isocyanate component can be advantageously reduced by increasing the average molecular weight of the poly (oxy $C_{2-4}$ alkylene) diol component to a molecular weight value of greater than 1100. These diols preferably have at least 80% by weight of ethyleneoxy groups. The resulting flexible foams retain their physical properties even when subjected to steam in an autoclave at 120° C. for 5 hours and the foams have a significant decrease in their swell property as compared to TDI foams. TDI based hydrophilic foams swell more than 100% by volume when wet while the present foams swell only 30–60% when wet.

The reduced percentage of the isocyanate such as Isonate 143-L allows the resulting foams to be flexible and resilient, compared to the foams having an Isonate 143-L content of greater than 50% which are semi-rigid and not resilient. Increases in the molecular weights of the diol allows for a decrease in the required amount of Isonate 143-L to such an extent that the ratio of isocyanate functional groups to the hydroxyl functional groups (known as the isocyanate index) can be reduced from 3.5/1 to about 3/1, a change which contributes to the flexibility of the foam product. Although flexibility is best characterized by the flexural modulus, the more readily available tensile modulus at 1% elongation has been used as an approximate classification of these foams into soft and flexible (modulus under 20 psi), firm but flexible (modulus between 20 and 40 psi), and the semi-rigid or rigid (modulus above 40 psi).

The preferred isocyanate containing product having a functionality greater than 2.0, is a mixture of diphenylmethane diisocyanate, abbreviated MDI, and isocyanate containing derivatives of MDI. One commercial product meeting this requirement is Isonate 143L which is produced by reacting MDI to form a carbodiimide and this material in turn then reacts to form a tri-functional cycloadduct. The mixture of MDI, the carbodiimide and the cycloadduct are in equilibrium. The mixture contains a major amount of pure diphenylmethane diisocyanate and minor amounts of carbodiimides and trifunctional cycloadducts of diphenylmethane diisocyanate. A mixture of the A and B components below constitute the 143L system.

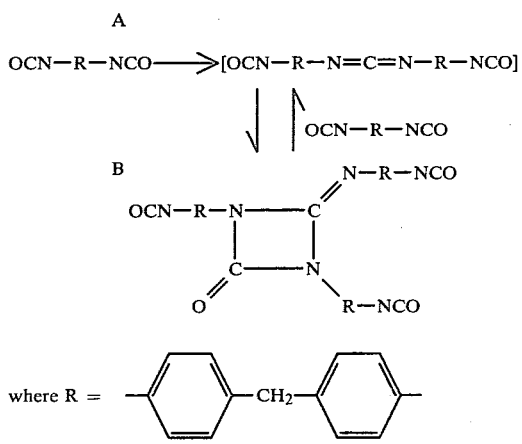

As used herein the term derivatives of diphenylmethane diisocyanate means products that have been made from MDI as a starting material. It would include adducts, dimers and trimers. It would not include materials such as polymethylene polyphenylisocyanates which are not made from MDI.

The prepolymer technology for making foams requires mixing with approximately an equal volume of water. This requires the prepolymer to be hydrophilic and it is the reason that at least some poly(oxyethylene) containing diol must be used in making the prepolymer made from the Isonate 143-L. The desirable viscosity for good mixing and foaming with water is in the range of about 10,000 - 35,000 cp at 25° C., and preferably about 20,000 cp. Both the viscosity and the hydrophilicity of the prepolymers are controlled by the proper choice of polyol type and molecular weight. The prepolymers must not thicken significantly during storage. It has been found that there will be sufficient storage stability if the viscosity does not rise above 100,000 cp (measured at 25° C.) after accelerated storage testing for two weeks at 80° C.

For a flexible foam to be useful in most applications, it should have tensile strength of at least 20 psi, a foam density of about 3–6 lb/cu. ft., and an elongation at failure of at least 100% with higher values being preferred. In one embodiment an elongation at failure of 200% has been obtained.

The diol used is a poly(oxy $C_{2-4}$ alkylene) diol containing at least 50% by weight of oxyethylene groups. Thus when the diol contains oxypropylene or oxybutylene or mixtures thereof, there must be also present this minimum amount of oxyethylene. The preferred diols have at least 80% by weight of oxyethylene groups.

In one of the preferred embodiments of this invention, it has been found satisfactory to use as the diol, a mixture of Carbowax 1000 and Carbowax 1450 manufactured by Union Carbide, although it is within the scope of the invention to use any combination of the more preferred poly(oxyethylene) diols with a number average molecular weight of 1000–2000, but preferably in the range of 1200–1400. In these instances the average of the molecular weights of all the diols will be of about at least 1100. By using a blend of these two diols in about equal molar amounts the resulting foams advantageously have low volume swell and low density.

Although it is within the scope of this invention to use any monomeric polyol as the crosslinking agent, the more preferred are those polyol crosslinking agents having 3 or 4 hydroxyl equivalents per mole. These include trimethyolpropane, trimethylolethane, glycerol, triethanolamine, pentaerythritol, or mixtures of these polyols. The most preferred is trimethylolpropane, TMOP, which has the formula

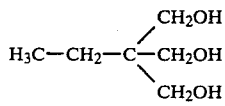

The density and physical properties of the foam appear to be sensitive to the polyol content. If it is desirable to have a foam wth a lower density, but which is firm and less rubbery then the amount of the polyol is increased. Similarly, if it is desirable to have higher density and more elasticity, then the amount of polyol is decreased. The operable amount of polyol crosslinking agent having a hydroxy functionality of 3 or 4 is such that 2% to 35% of the hydroxyl content of the diol and polyol mixture comes from the polyol. The preferred range for a good flexible foam is 10% to 30% hydroxyl from the polyol. When the amount of polyol crosslinking agent is expressed with respect to the amount of diol present, the diol and polyol crosslinking agents are present in a mole ratio of about 4:1 to 8:1.

Carbowax 1000 has an equivalent weight of 500 per hydroxyl group while TMOP with a molecular weight of 134 has an equivalent weight of 45 per hydroxyl group. Since the Isonate 143L is used to combine with the hydroxyl groups, the amount of the isocyanate required will be very sensitive to the amount of TMOP and thus the amount of TMOP is relatively carefully controlled. The operable amount of Isonate 143-L is such that the isocyanate index is 2.5–3.5, but preferably 2.8 to 3.2 and with very good results at 3.1. Higher ratios allow lower polymer viscosity, lower foam density and less swelling, but they also add cost and reduce softness and elongation. When the prepolymer is made, one isocyanate group of the polyisocyanate component reacts with a hydroxyl group to leave the remaining isocyanate group unreacted. These free isocyanate groups on the prepolymer then react with water to form polyurea linkages with simultaneous increase in molecular weight and the release of $CO_2$ which aids in forming the foamed product.

When reacting the components to form the prepolymer, it has been helpful to measure the isocyanate level by titration after the reaction has taken place for about one hour. From this reading and subsequent titrations one can determine the additional reaction time required to reduce the isocyanate level down to about the level which is the theoretical point at which all of the hydroxyl groups will have reacted with the isocyanate. If the reaction is permitted to continue so the isocyanate level is further reduced, then the prepolymer viscosity increases, making it more difficult to subsequently mix the prepolymer with water. Over reacting the prepolymer components will also cause the foam density to increase as well as to decrease the water absorptive property of the resulting foam.

Surfactants are chosen to give a foam with a good appearance that has the correct cell size, shape and lack of collapse or splits. Surfactants which are known to be useful in polyurethane foams may be employed here. Examples of preferred surfactants are the block copolymers of oxyethylene and oxypropylene such as the Pluronic Polyol surfactants manufactured by BASF Wyandotte Corp. of Wyandote, Michigan. A preferred surfactant is Pluronic L-62.

In making the polyurethane foam the preferred procedure is to add about an equal amount of the aqueous suspension with the prepolymer mixture and to then mix the two together. The composition of the aqueous suspension can be also expressed on the basis of 100 parts of prepolymer resin. Thus, 100 parts of water per 100 parts of resin is written 100 phr water. The ratio of the amount of the prepolymer mixture to the aqueous suspension can vary over a wide range. However, if the amount of the aqueous suspension is too large, then the strength of the resulting foam drops. On the other hand if the amount of the aqueous suspension is decreased too much, then it will not be possible to add enough fibers and fillers which are supplied via the aqueous suspension.

The preferred method of foaming the prepolymer is to heat the aqueous suspension, for example, a 2% solution of Pluronic L-62 surfactant, as well as the prepolymer, to a temperature of approximately 35° C. These are poured or pumped together in a ratio of about 100 parts by weight of aqueous suspension to about 80 parts by weight of the prepolymer and stirred immediately for up to 30 seconds by a mechanical stirrer such as a blade attached to a drill motor. This length of time allows complete mixing but does not allow an appreciable degree of chemical reaction to occur. This mixture is poured immediately into a mold, where the rising and curing of the foam product takes place.

Fibers can be added to the aqueous phase for insertion into the foam composition to provide additional structural rigidity. Polyester fibers are especially advantageous and they can be cut up into lengths of about ½ inch or less. With respect to the aqueous suspension the fibers can be added in various amounts although they preferably do not constitute more than about 10% by weight because above that level the suspension becomes too difficult to pump.

A high molecular weight suspending or thickening agent can also be added to serve two functions. First it keeps the ingredients suspended so the water does not drain out of the fibers and so that the fibers do not float. Secondly, the thickening agent acts as a lubricant for the fibers so they do not tangle, dewater and jamp up when going through the mixing pump. Examples of thickening agents are Polyox WSR, Natroso, Xanthan gums, and polyacrylamides such as Dow's Separan AP 30 which have high molecular weights of about one million or so.

Preferred suspending or thickening agents are the Carbopol resins made by the B. F. Goodrich Chemical Co. such as Carbopol 934, Carbopol 940 and especially Carbopol 941. Since the Carbopol resins are acrylic acid polymers with an acid moiety, a neutralizing agent such as sodium or ammonium hydroxide can be added. When adding ammonium hydroxide as the neutralizing agent to the Carbopol, there is an advantageous increase in viscosity of the aqueous phase. Also since ammonium hydroxide is less expensive then Carbopol, a more economical formulation having the same amount of thickening can be made which utilizes less Carbopol.

Depending on optional fibers, fillers, antiseptics, pigments, thickeners, or other water soluble or water dispersible components which might be incorporated, the best surfactant might vary from a highly hydrophobic silicone type such as L-520 (Union Carbide) or other silicone surfactants to a very hydrophilic type such as Brij-58 (ICI-America) or the other Brij, Span, or Tween products from ICI. For general use, we prefer the nonionic surfactants such as the Pluronics, especially L-62, L-72, L-92, P-75 or P-85 (BASF-Wyandotte). The use of these surfactants would be familiar to one skilled in the formulation of polyurethane foam products.

The water adsorption tests is conducted by cutting out a rectangular foam sample of dimensions 1×3×5 inches. It is soaked in water and held up until it is no longer dripping. The ratio of the wet weight to the dry weight is the water adsorption ratio.

Having described the basic aspects of our invention, the following examples are given to illustrate specific embodiments thereof.

EXAMPLE 1

A mixture of Carbowax 1000 (174 g, 0.174 mole), Carbowax 1450 (249 g, 0.172 mole) and trimethylolpropane (6.1 g, 0.045 mole) was dried by heating for two hours at 70° C. under a reduced pressure of 2 Torr. To the dried and degassed polyol mixture was added 365 g (2.56 equivalents of isocyanate) of Isonate-143L. The temperature was maintained at 70° C. for 70 minutes to complete the reaction. The product was a light yellow liquid with isocyanate content of 2.18 meq/g and viscosity at 25° C. of 23,000 cp. After storage of a sample for two weeks at 80° C., the product had thickened only to 40,000 cp at 25° C. When 80 g of the product heated to 35° was stirred with 100 ml of a 2% solution of Pluronic L-62, a nonionic surfactant from Wyandotte, there resulted a foam with a density of 4.1 lb/ft$^3$ which was soft, flexible, hydrophilic, and which exhibited the properties summarized in Table II.

TABLE I

| Prepolymer Composition | Examples | | | |
|---|---|---|---|---|
| | 1 | 2 | 3 | 4 |
| Composition of Diol | | | | |
| Carbowax 1000 g | 174 | 83 | 90 | — |
| Carbowax 1450 g | 249 | 357 | 387 | 456 |
| Avg. Mol. Wt. | 1265 | 1335 | 1365 | 1450 |
| Triol Compound | | | | |
| TMOP g | 6.1 | 7.3 | 1.6 | 7.0 |
| % Hydroxyl Contributed | 16 | 20 | 5 | 20 |
| Mole Ratio | | | | |
| Diol/Triol | 7.6 | 6.0 | 30.0 | 6.0 |
| Isonate 143 L g | 365 | 352 | 320 | 337 |
| Isocyanate Index | 3.1 | 3.0 | 3.4 | 3.0 |
| Isocyanate Content meq./g | 2.18 | 2.07 | 2.51 | 1.97 |
| Viscosity at 25° C. | | | | |
| Initial cp × 10$^{-3}$ | 23 | 24 | 18 | 19 |
| Aged - 2 weeks at 80° C. cp × 10$^{-3}$ | 40 | 80 | 54 | 43 |

TABLE II

| Physical Properties of Foamed Products | Examples | | | |
|---|---|---|---|---|
| | 1 | 2 | 3 | 4 |
| Density lb/ft$^3$ | 4.1 | 5.1 | 4.1 | 5.5 |
| Tensile psi | 31 | 24 | 38 | 24 |
| Elongation % | 200 | 170 | 130 | 170 |
| 1% Modulus psi | 16 | 18 | 40 | 17 |
| % Volume Swell Wet/Dry | 47 | 53 | 32 | 58 |
| Compression Set % after 5 hrs. in steam autoclave at 120° C. | 20 | 19 | 14 | 12 |
| Water adsorption ratio | 16 | 20 | — | 21 |

EXAMPLES 2-4

These examples illustrate the foams obtained using different prepolymer compositions. The compositions are listed in Table I and the foam properties are given in Table II.

In Example 2, the average molecular weight of the diol was increased, allowing the use of less isocyanate and resulting in a foam with higher density and more capacity for water.

In Example 3, the amount of TMOP crosslinker was reduced and the isocyanate index was increased to 3.4 to maintain strength. However, the ratio of diol to triol was outside the range of this invention and thus this is a comparison example. Although a stiff foam was obtained, it would not wick water and become wet so it was not possible to obtain the water adsorption ratio.

In Example 4, a single diol, Carbowax 1450, was employed with TMOP as the crosslinking agent. A good, soft hydrophilic foam with high elongation, yet good water-holding capacity and steam resistance was obtained.

It is understood that the foregoing detailed description is given merely by way of illustration and than many variations may be made therein without departing from the spirit of this invention.

We claim:

1. A flexible polyurethane foam based on methylene diphenyl isocyanate made by mixing together and reacting an aqueous phase and a resin phase comprising a prepolymer derived from
   (a) a poly(oxy C$_{2-4}$ alkylene) diol having at least about 50% by weight of oxyethylene groups and a nominal number average molecular weight of about at least 1100, said diol having nominally two hydroxyl equivalents per mole,
   (b) a diphenylmethane diisocyanate-containing isocyanate product with a functionality of greater than 2.0 comprising a mixture of a major amount of pure diphenylmethane diisocyanate and minor amounts of carbodiimides and trifunctional cycloadducts of diphenylmethane diisocyanate, and
   (c) a monomeric polyol crosslinking agent having 3 or 4 hydroxyl equivalents per mole,
   said isocyanate containing product comprising less than 50% by weight of the prepolymer,
   said diol and polyol crosslinking agent being present in a mole ratio in the range of about 4:1 to 8:1, and the ratio of the isocyanate equivalents to the total hydroxyl equivalents being in the range of about 2.5:1 to 3.5:1.

2. A foam according to claim 1, wherein the nominal number average molecular weight of the poly(oxy C$_{2-4}$ alkylene) diol is between 1100 and 2000 and the diol has at least 80% by weight of oxyethylene groups.

3. A foam according to claim 2, wherein the nominal number average molecular weight of the poly(oxy $C_{2-4}$ alkylene) diol is between 1200 and 1500.

4. A foam according to claim 1, wherein the poly(oxy $C_{2-4}$ alkylene) diol comprises a mixture of at least 2 diols each having a different nominal number average molecular weight.

5. A foam according to claim 4, wherein said mixture of diols comprises a diol with a molecular weight of about 1000 and a diol of a molecular weight of about 1450.

6. A foam according to claim 5, wherein the diol mixture comprises about equal molar amounts of the two diols.

7. A foam according to claim 1, wherein the polyol crosslinking agent is selected from the group consisting of trimethylolpropane, trimethylolethane, glycerol, triethanolamine, pentaerythritol, and mixtures thereof.

8. A foam according to claim 7, wherein the polyol crosslinking agent is trimethylolpropane.

9. A foam according to claim 1, further comprising reinforcing fibers.

10. A foam according to claim 9, wherein the reinforcing fibers are polyester fibers of a length of about ½ inch or less.

11. A foam according to claim 10, further comprising a thickening or suspending agent.

12. A prepolymer for use in making a flexible foam comprising the reaction product of
(a) a poly(oxy $C_{2-4}$ alkylene) diol having at least about 50% by weight of oxyethylene groups and a nominal number average molecular weight of about at least 1100, said diol having nominally two hydroxyl equivalents per mole,
(b) a diphenylmethane diisocyanate-containing isocyanate product with a functionality of greater than 2.0 comprising a mixture of a major amount of pure diphenylmethane diisocyanate and minor amounts of carbodiimides and trifunctional cycloadducts of diphenylmethane diisocyanate, and
(c) a monomeric polyol crosslinking agent having 3 to 4 hydroxyl equivalents per mole,
said isocyanate containing product comprising less than 50% by weight of the prepolymer,
said diol and polyol crosslinking agent being present in a mole ratio in the range of about 4:1 to 8:1, and
the ratio of the isocyanate equivalents to the total hydroxyl equivalents being in the range of about 2.5:1 to 3.5:1.

13. A prepolymer according to claim 12, wherein the molecular weight of the poly(oxy $C_{2-4}$ alkylene) diol is between 1100 and 2000.

14. A prepolymer according to claim 13, wherein the nominal number average molecular weight of the poly(oxy $C_{2-4}$ alkylene) diol is between 1200 and 1500.

15. A prepolymer according to claim 12, wherein the poly(oxy $C_{2-4}$ alkylene) diol comprises a mixture of at least 2 diols each having a different nominal number average molecular weight.

16. A prepolymer according to claim 15, wherein said mixture of diols comprises a diol with a molecular weight of about 1000 and a diol of a molecular weight of about 1450.

17. A prepolymer according to claim 16, wherein the diol mixture comprises about equal molar amounts of the two diols.

18. A prepolymer according to claim 12, wherein the monomeric polyol crosslinking agent is selected from the group consisting of trimethylolpropane, trimethylolethane, glycerol, triethanolamine, pentaerythritol, and mixtures thereof.

19. A prepolymer according to claim 18, wherein the polyol crosslinking agent is trimethylolpropane.

* * * * *